United States Patent
Hall (10) Patent No.: US 12,398,800 B2
(45) Date of Patent: Aug. 26, 2025

(54) SHIFT SYSTEM FOR A VEHICLE

(71) Applicant: GM Global Technology Operations LLC, Detroit, MI (US)

(72) Inventor: Devon Robert Hall, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 120 days.

(21) Appl. No.: 18/449,694

(22) Filed: Aug. 14, 2023

(65) Prior Publication Data

US 2025/0060030 A1    Feb. 20, 2025

(51) Int. Cl.
*F16H 61/12*    (2010.01)
*F16H 59/12*    (2006.01)

(52) U.S. Cl.
CPC ............. *F16H 59/12* (2013.01); *F16H 61/12* (2013.01); *F16H 2061/1212* (2013.01)

(58) Field of Classification Search
CPC ... F16H 59/12; F16H 61/12; F16H 2061/1212
See application file for complete search history.

(56) References Cited

U.S. PATENT DOCUMENTS

| | | | | |
|---|---|---|---|---|
| 2,861,464 A * | 11/1958 | Jensen | ............... | G05D 3/127 74/335 |
| 4,611,286 A * | 9/1986 | Nishimura | ........... | G07D 11/00 902/22 |
| 11,892,076 B2 * | 2/2024 | Kim | ................ | F16H 61/18 |
| 2017/0248227 A1 * | 8/2017 | Zhao | ................ | F16H 61/36 |

* cited by examiner

*Primary Examiner* — Edwin A Young
(74) *Attorney, Agent, or Firm* — Honigman LLP; Matthew H. Szalach; Jonathan P. O'Brien (57) ABSTRACT

A shift system includes a shifter including a first switch, a second switch, and an interlock switch and being operable between a plurality of gear states. A controller is communicatively coupled with the shifter to receive signals that correspond to each of the first switch, the second switch, and the interlock switch. The controller includes a diagnostic counter that includes a passing criteria and a predetermined diagnostic threshold and is configured to adjust the diagnostic counter based on at least one of the signals received from the shifter being inconsistent with the others of the signals received.

20 Claims, 6 Drawing Sheets

SHIFT SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a shift system for a vehicle.

A vehicle lever shifter is used in conventional vehicles to transition the vehicle between different operative states. For example, a driver may select one of the levers to put the vehicle in drive. While the vehicle operative states corresponding to movement are operable via the lever, conventional shift systems have a separate button or switch for a parking function. To communicate the selection of an operative state, the lever shift uses two channels to communicate a position of one of the levers or park button of a vehicle to a vehicle module. The vehicle module may function to execute the lever selection through various methods.

For functional reasons, three communication channels would provide increased position communication between the lever shifter and the vehicle module. However, vehicle modules typically only have two available channels for lever shifter communication. The communication channels may be configured using a serial communication bus between the vehicle lever shifter and the vehicle module. The signals sent back and forth between the lever shifter and the vehicle module communicate the selected operative state of the vehicle with each selection using multiple signals to confirm the selection.

SUMMARY

In one configuration, a vehicle shift system includes a first gear switch operable between a plurality of gear states, a second gear switch operable between the plurality of gear states, and an interlock switch operable between an open state and a closed state. The closed state corresponds to one of the plurality of gear states. A controller is communicatively coupled to each of the first gear switch, the second gear switch, and the interlock switch. The controller includes a diagnostic counter and is configured to register a diagnostic on the diagnostic counter when a signal from at least one of the first gear switch, the second gear switch, and the interlock switch is different from the other of the first gear switch, the second gear switch, and the interlock switch.

The system may include one or more of the following optional features. For example, the plurality of gear states may include a reverse state, a neutral state, and a drive state. The closed state of the interlock switch may correspond to activation of one of the reverse state, the neutral state, and the drive state. The controller may include a memory storing a predetermined diagnostic threshold and may be configured to compare a signal from the interlock switch with a signal from each of the first gear switch and the second gear switch, respectively. The controller may be configured to detect one or more of the first gear switch, the second gear switch, and the interlock switch being activated via the respective signals. The diagnostic counter of the controller may be configured with a passing criteria and a non-passing criteria and may be configured to reduce a diagnostic log based on a predetermined number of pass accruals of the passing criteria. The pass accruals may include the controller receiving a signal from each of the first gear switch, the second gear switch, and the interlock switch.

In another configuration, a shift system includes a shifter including a first switch, a second switch, and an interlock switch and being operable between a plurality of gear states. A controller is communicatively coupled with the shifter to receive signals that correspond to each of the first switch, the second switch, and the interlock switch. The controller includes a diagnostic counter that includes a passing criteria and a predetermined diagnostic threshold and is configured to adjust the diagnostic counter based on at least one of the signals received from the shifter being inconsistent with the others of the signals received.

In some examples, the interlock switch may be a resistor ladder circuit operable between an open state and a closed state. The controller may be configured to add a diagnostic to the diagnostic counter when a signal of the interlock switch is different than a signal of at least one of the first switch and the second switch. The first switch and the second switch may each include a plurality of gear states that include a reverse state, a neutral state, and a drive state. The closed state of the interlock switch may include one of the plurality of gear states. Optionally, the controller may be configured to add a diagnostic to the diagnostic counter when the interlock switch is in the open state and the first switch and the second switch are in a same one of the plurality of gears. In some aspects, the diagnostic counter may include a standard diagnostic log and an interlock diagnostic log. The standard diagnostic log may correspond to signals received from the first switch and the second switch, and the interlock diagnostic log may correspond to a signal received from the interlock switch.

In yet another configuration, a shift system for a vehicle includes a gear switch including a first switch and a second switch each operable between a reverse state, a neutral state, and a drive state. An interlock switch is communicatively coupled to the gear switch and is operable between an open state and a closed state selectively corresponding to one of the reverse state, the neutral state, and the drive state. A controller is communicatively coupled to the gear switch and the interlock switch and is configured to receive signals from the interlock switch and the gear switch. The controller stores a diagnostic counter that is configured to track a difference between the signal received from the interlock switch and the signal received from the gear switch. The diagnostic counter includes a predetermined diagnostic threshold for each of the gear switch and the interlock switch, respectively.

In some examples, the signal of the interlock switch may include one of the open state and the closed state of the interlock switch and the signals of the gear switch may include one of the reverse state, the neutral state, and the drive state of each of the first switch and the second switch. The controller may be configured with a passing criteria and may be configured to reduce a diagnostic count of the diagnostic counter based on the passing criteria. The passing criteria may be defined by the interlock switch being in the closed state and both of the first switch and the second switch being in a same state of any one of the reverse state, the neutral state, and the drive state. In some aspects, the controller may be configured to determine an activation time between the signals received from the gear switch and the interlock switch. The controller may be configured to log a pass accrual based on the activation time.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a." "an," and "the" may be intended to include the plural forms as well, unless the context clearly indicates otherwise. The terms "comprises," "comprising." "including." and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on." "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first." "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. e.g., magnetic, magneto optical disks, or optical disks. However, a computer need not have such devices. Computer readable media suitable for storing computer program instructions and data include all forms of non-volatile memory, media and memory devices, including by way of example semiconductor memory devices. e.g., EPROM, EEPROM, and flash memory devices; magnetic disks. e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-4, a vehicle 10 includes a vehicle body 12, which defines an interior cabin 14 of the vehicle 10 with one or more seating rows 16 including a driver seat 16a and a passenger seat 16b. A display console 18 may be positioned between the driver seat 16a and the passenger seat 16b to display information to a driver or occupant of the vehicle 10 including, but not limited to, navigation, entertainment, and vehicle service information. The vehicle 10 includes a shifter driver interface 20 communicatively coupled with a vehicle propulsion or shift system 100 of the vehicle 10. The shifter driver interface 20 is operable to adjust gears of the vehicle 10 to translate between various operative states, as described below.

Figure 1:
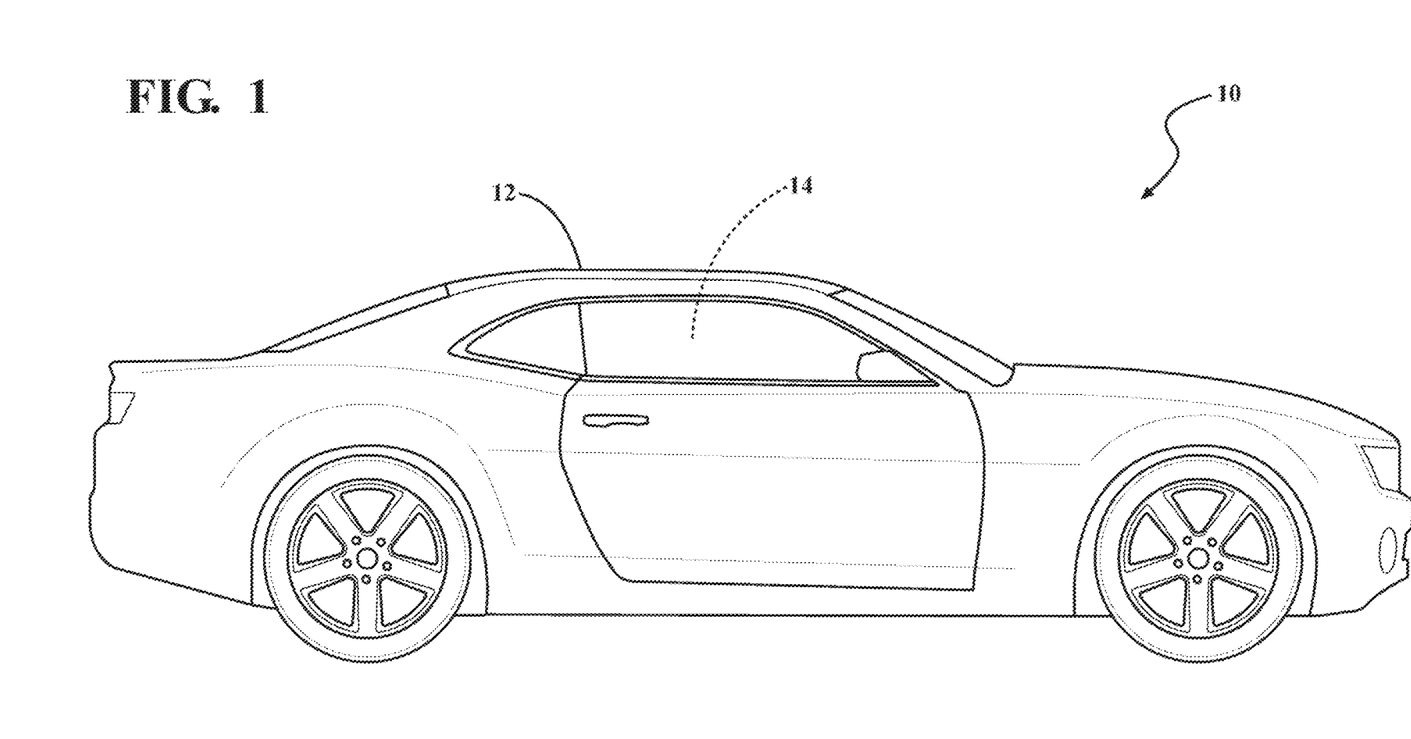
FIG. 1 is a perspective view of a vehicle according to the present disclosure.

A controller 200 of the vehicle 10 is communicatively coupled to the shift system 100 and the display console 18 to display information to the driver from the controller 200. For example, the display console 18 may display notifications from the controller 200 pertaining to the shifter driver interface 20, as described below, notifying the driver of potential service recommendations for the vehicle 10. In some configurations, the controller 200 is configured as part of the shift system 100 and is communicatively coupled to individual elements of the shift system 100.

Figure 2:
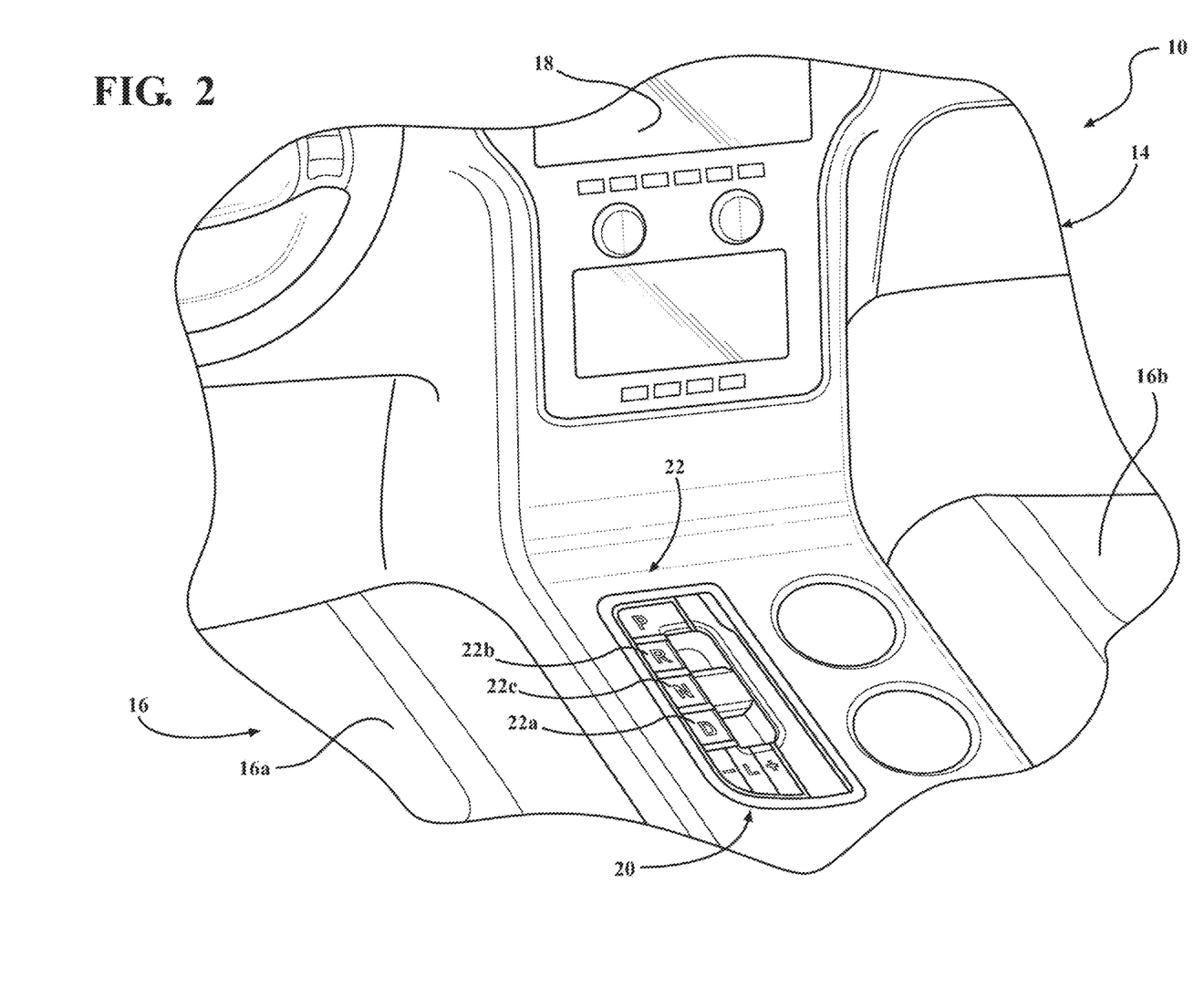
FIG. 2 is an enlarged partial perspective view of a shifter driver interface according to the present disclosure.

As illustrated in FIG. 2, the shifter driver interface 20 includes a plurality of actuators 22 electrically coupled to the shift system 100 and configured to select one of a plurality of gear states 24 of the vehicle 10. The plurality of actuators 22 includes, but is not limited to, a drive actuator 22a, a reverse actuator 22b, and a neutral actuator 22c each respectively corresponding to one of the plurality of gear states 24. For example, the gear states 24 include a drive state 24a, a reverse state 24b, and a neutral state 24c of the vehicle 10. The gear states 24 of the vehicle 10 are defined by a propulsion activity (e.g., drive, reverse, neutral) of the vehicle 10. The shifter driver interface 20 activates the propulsion activity in response to an input to one of the actuators 22a-22c.

With further reference to FIGS. 1-4, the shift system 100 of the shifter driver interface 20 includes a gear shifter or switch 102 and an interlock switch 104, each in communication with the plurality of actuators 22. The gear switch 102 is communicatively coupled to the controller 200 and includes a first switch 102a and a second switch 102b. As used herein, the term gear switch 102 may collectively refer to the first switch 102a and the second switch 102b. The gear switch 102 transmits gear signals 106a, 106b to the controller 200 corresponding to one of the gear states 24 via both of the first switch 102a and the second switch 102b, respectively. For example, the first switch 102a transmits a first gear signal 106a to the controller 200, and the second switch 102b transmits a second gear signal 106b to the controller 200.

Both the first gear signal 106a and the second gear signal 106b correspond to one or more of the gear states 24, mentioned above, to indicate to the controller 200 the selection of one or more of the actuators 22a-22c by the driver. For example, the driver may actuate the drive actuator 22a, and both the first switch 102a and the second switch 102b are configured to send respective first and second gear signals 106a. 106b to the controller 200 indicating the selection of the drive state 24a. Stated differently, the gear signals 106a. 106b transmit the selection of one of the drive state 24a, the reverse state 24b, and the neutral state 24c to the controller 200 via the corresponding actuator 22a-22c by the driver. The gear signals 106a, 106b are specific to the gear state 24a-24c, such that the controller 200 identifies the selected gear state 24a-24c upon receipt of the gear signals 106a, 106b. In some examples, each of the gear signals 106a, 106b may output a voltage value received by the controller 200. For example, one or more of the gear signals 106a. 106b may include a voltage that is perceived by the controller 200 to indicate the pressing of the respective actuator 24a-24c. Thus, the controller 200 may identify whether multiple actuators 24a-24c have been pressed or otherwise actuated simultaneously. Namely, the shift system 100 controls or otherwise executes shifting of the shifter driver interface 20 between various transmission states corresponding to vehicle propulsion and communicates the shifting election with the controller 200.

Referring still to FIGS. 1-4, the first switch 102a is communicatively coupled to the controller 200 to transmit the first gear signal 106a corresponding to one or more of the drive state 24a, the reverse state 24b, and the neutral state 24c. The first gear signal 106a is received by the controller 200 with one or more respective states 24a-24c and is registered by the controller 200 as a press function. The second switch 102b is communicatively coupled to the controller 200 to transmit the second gear signal 106b corresponding to the same one or more of the drive state 24a, the reverse state 24b, and the neutral state 24c as the first gear signal 106a. If the second gear signal 106b is different than the first gear signal 106a, then the controller 200 will log a diagnostic 202, described in more detail below. Each of the first gear signal 106a and the second gear signal 106b is compared with an interlock signal 110 received by the controller 200 from the interlock switch 104.

The interlock switch 104 is operable between an open state 110a and a closed state 110b, collectively communicated to the controller 200 as the interlock signal 110. Similar to the gear switch 102, the interlock switch 104 is configured to detect actuation of one of the actuators 22a-22c by the driver. The interlock switch 104, like the gear switch 102, detects each of the drive state 24a, the reverse state 24b, and the neutral state 24c. Unlike the gear switch 102, the interlock switch 104 transmits a binary, interlock signal 110 to the controller 200. Stated differently, the interlock switch 104 communicates either the open state 110a or the closed state 110b with the controller 200 irrespective of the specific gear state 24 selected. For example, the interlock signal 110 does not transmit any information or identifying data as to which of the gear states 24 was selected.

While the interlock switch 104 detects the selected gear state 24, the interlock switch 104 transmits the binary interlock signal 110 to the controller 200. The interlock signal 110, as described in more detail below; is used as a comparison check by the controller 200 with the gear signals 106a. 106b. The binary configuration of the interlock signal 110 advantageously reduces manufacturing costs associated with the shift system 100 by minimizing the number of communication buses used in the shift system 100. For example, the gear switch 102 utilizes multiple communication pathways and buses in association with the gear states 24 to translate the detected state 24a-24c to the controller 200. Comparatively, the interlock switch 104 is configured on a single resistor ladder circuit 112 that detects the selection of one of the gear states 24 as a binary open state 110a or closed state 110b of the interlock switch 104. It is advantageous for the shift system 100 to include both the gear switch 102 that identifies the specific gear state 24 selected by the driver and the interlock switch 104 as backup confirmation that one of the gear states 24 was selected, irrespective of which one.

Figure 3:
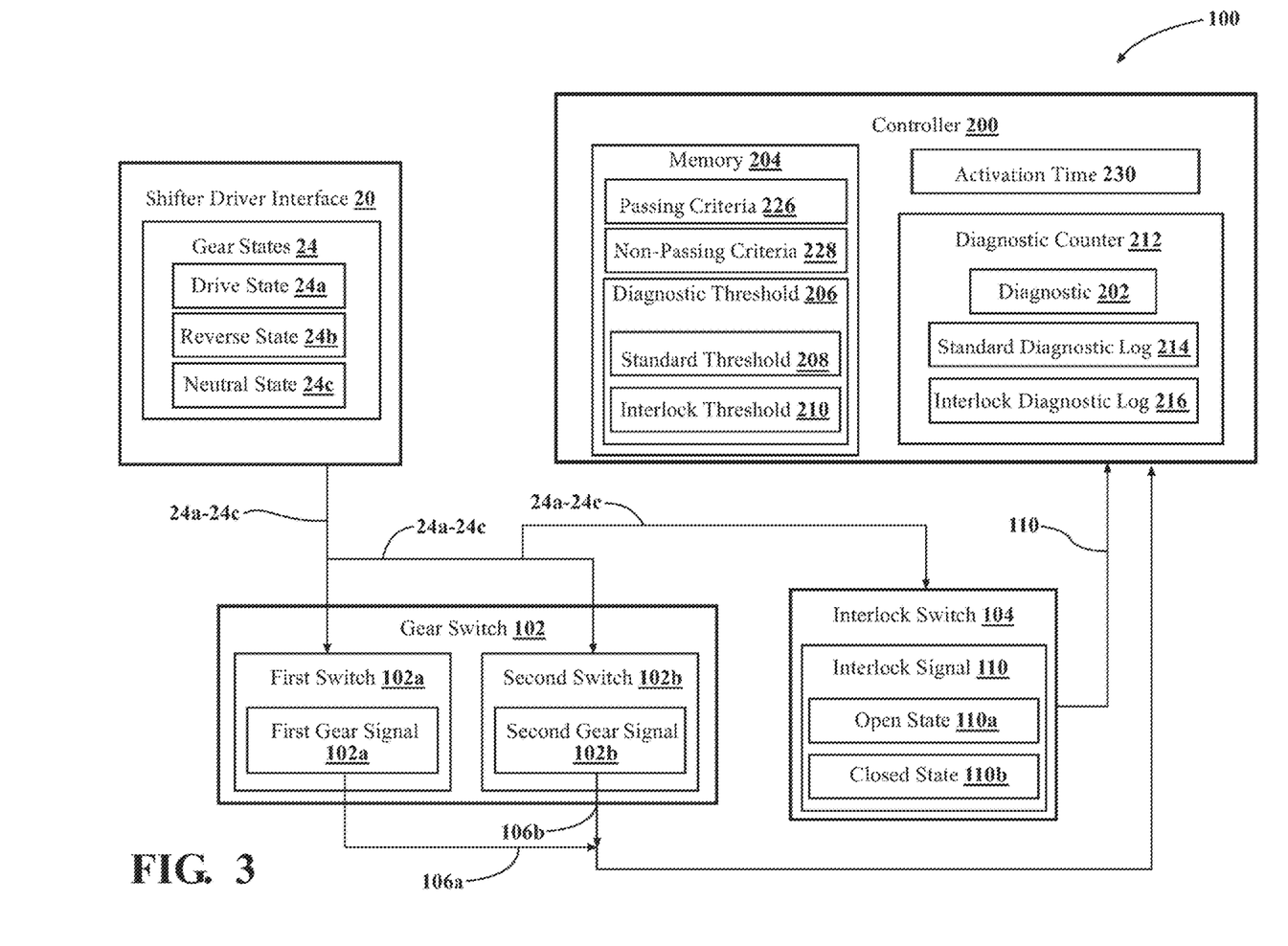
FIG. 3 is a functional block diagram of an example of a shift system providing communication between a shifter driver interface, a gear switch, an interlock switch, and a controller according to the present disclosure.
Figure 4:
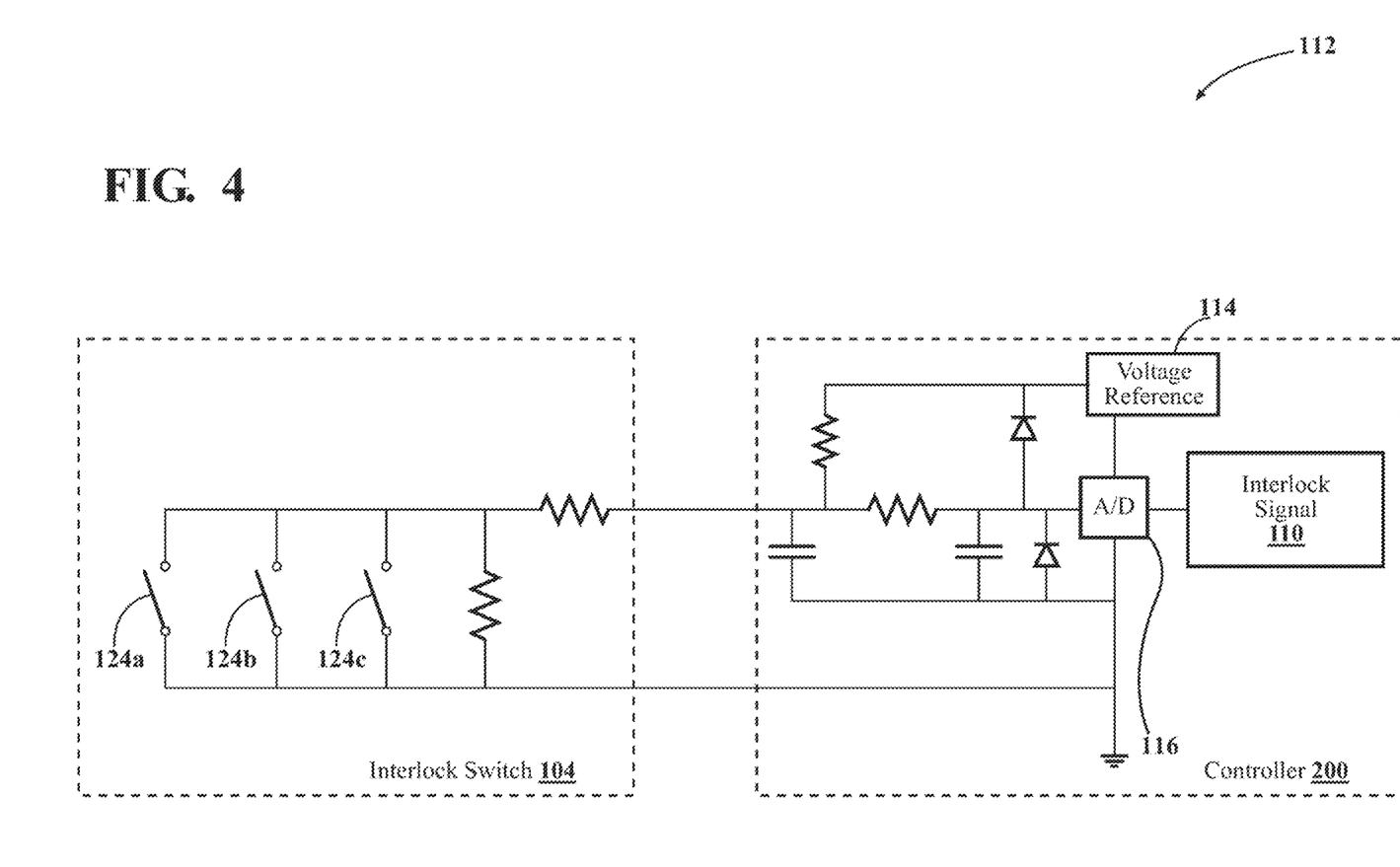
FIG. 4 is a functional block diagram of an example resistor ladder for an interlock switch according to the present disclosure.
Figure 5:
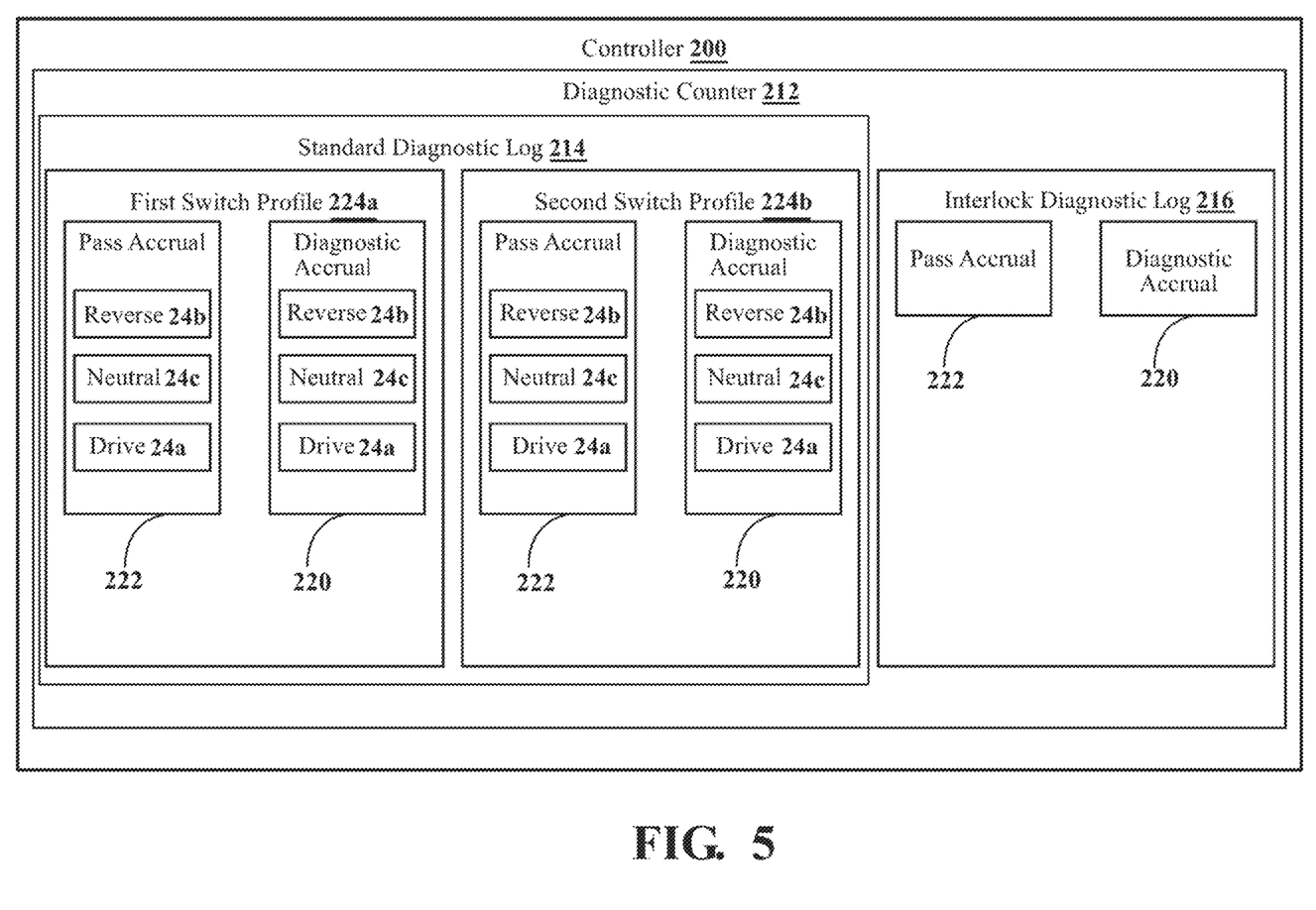
FIG. 5 is a functional block diagram of an example diagnostic counter according to the present disclosure.

With reference now to FIGS. 3-5, the controller 200 is configured to receive the gear signals 106a, 106b identifying one of the gear states 24 from each of the first switch 102a and the second switch 102b. The controller 200 also receives the interlock signal 110 from the interlock switch 104 indicating the state 110a, 110b of the interlock switch 104. As mentioned above, the state 110a, 110b of the interlock switch 104 corresponds to one of the open state 110a and the closed state 110b. The closed state 110b corresponds to a pressed condition of one or more of the actuators 22a-22c, and the open state 110a corresponds to an unpressed condition of all of the actuators 22a-22c, described in more detail below.

With specific reference to FIG. 4, the interlock switch 104 serves as a confirmation switch to validate the information received from the gear switch 102 to the controller 200. In some aspects, the interlock switch 104 may confirm a failure of one of the gear switches 102. The interlock switch 104 is mapped onto a single resistor ladder circuit 112 spanning the interlock switch 104 and the controller 200. As illustrated, the interlock switch 104 includes three input switches 124a, 124b, 124c corresponding to the respective gear states 24 and operable between the open state 110a and the closed state 110b. As described further below, one of the input switches 124a-124c moves from the open state 110a to the closed state 110b in response to an input on a corresponding actuator 22a-22c. In response, the interlock switch 104 communicates the interlock signal 110 to the controller 200 of the closed state 110b. The interlock signal 110 is free from identifying information associated with the respective input switch 124a-124c, such that the controller 200 identifies the state of the interlock switch 104 and not the gear state 24 from the interlock signal 110. The controller 200 may then use the state 110a, 110b of the interlock switch 104 to validate the gear signals 106a, 106b received from the gear switch 102.

The state 110a, 110b of the interlock switch 104 may be determined by the controller 200 based on a voltage reference 114 of the interlock signal 110. For example, the resistor ladder circuit 112 may utilize an analog-to-digital (A/D) converter 116 that receives the interlock signal 110 to convert the interlock signal 110 to the binary signal read by the controller 200. The voltage reference 114 is presented to the A/D converter 116 based on the state 110a. 110b of the interlock signal 110 and may be used in converting the binary signal 110 for the controller 200. Using the analog voltage reference 114 provides cost saving advantages as compared to the incorporation of a third communication pathway with a similar construction as the communication pathways used for the gear switches 102.

Referring to FIGS. 3-6, the controller 200 includes a memory 204 that stores a predetermined diagnostic threshold 206. The predetermined diagnostic threshold 206 is a threshold value of the diagnostics 202 accrued during operation of the vehicle 10. The controller 200 is configured to prevent the shifter driver interface 20 from executing the selected gear state 24 at the predetermined diagnostic threshold 206 and may issue a notification indicating recommended service to the shifter driver interface 20. Stated differently, the predetermined diagnostic threshold 206 corresponds to an accrual value at which the controller 200 is configured to prevent gear shifting of the shifter driver interface 20. The controller 200 may, in some aspects, send a notification to the driver that service or maintenance is recommended on the vehicle 10 to address the diagnostics 202.

The predetermined diagnostic threshold 206 includes a standard threshold 208 that sets the threshold value of diagnostics 202 for the gear switch 102, with each of the first switch 102a and the second switch 102b having the same standard threshold 208. Additionally or alternatively, the standard threshold 208 may be further segmented, such that the first switch 102a and the second switch 102b may have different thresholds. The diagnostic threshold 206 also includes an interlock threshold 210 corresponding to the interlock switch 104. The interlock threshold 210 sets the threshold number of diagnostics 202 specifically related to the interlock signal 110. For example, the controller 200 may similarly prevent actuation of the gear state when the interlock switch 104 meets or exceeds the interlock threshold 210. As noted above, the controller 200 may also issue a notification to the driver of recommended service to the shifter driver interface 20 based on either or both of the standard threshold 208 and the interlock diagnostic log 210 being met.

The controller 200 includes a diagnostic counter 212 configured with the diagnostics 202 to track the signals 106a, 106b, 110 received from the gear switch 102 and the interlock switch 104. The diagnostic counter 212 may, in combination with functions of the controller 200, record a discrepancy whenever there is a discrepancy between any of the signals 106a, 106b, 110. Where a discrepancy occurs, the diagnostic counter 212 will log a diagnostic 202 associated with the inconsistent switch 102, 104. The diagnostic 202 includes a standard diagnostic log 214 and an interlock diagnostic log 216. The diagnostics 202 may be categorized with respect to the standard diagnostic log 214 and the interlock diagnostic log 216 based on the signal received by the controller 200.

The standard diagnostic log 214 tracks the number of diagnostics 202 that accrue over a lifetime of the vehicle 10. Similarly, the interlock diagnostic log 216 tracks the number of diagnostics 202 that accrue for the interlock switch 104 over the lifetime of the vehicle 10. In some examples, the diagnostic counter 212 may be manually cleared using a servicing tool to reset the diagnostic counter 212. In addition to logging diagnostics 202, the diagnostic counter 212 may also log instances where the signals 106a, 106b, 110 are all validated, as described below with respect to FIG. 5.

With continued reference to FIGS. 3-6, the controller 200 may receive the interlock signal 110 and determine an inconsistency as compared with the gear signals 106a, 106b. Thus, the diagnostic counter 212 may accrue a diagnostic 202 on the interlock diagnostic log 216. Examples of the process of accruing a diagnostic 202 are described in more detail below. The accruals associated with diagnostics 202 may be referred to as diagnostic accruals 220. It is also contemplated that the diagnostic counter 212 may also record pass accruals 222 for each of the gear switch 102 and the interlock switch 104. The pass accruals 222 mark the number of times all three of the switches 102a, 102b, 104 were registered by the controller 200. Stated differently, the pass accruals 222 may tabulate each time the gear signals 106a. 106b are confirmed by the interlock signal 110.

The diagnostic accruals 220 and pass accruals 222 may be incorporated as passing criteria and non-passing criteria stored in the memory 204. The controller 200 may utilize the pass accruals 222 in determining whether to activate the shifter driver interface 20 or prompt the driver with a notification for recommended service to the shifter driver interface 20. The number of pass accruals 222 may nullify or incrementally reduce the diagnostic accruals 220. Similarly, the controller 200 may reduce the diagnostic logs 214, 216 based on a predetermined number of pass accruals 222 that correspond to the passing criteria. Each of the pass accruals 222 and the diagnostic accruals 220 are tabulated for each signaled state 24a-24c from the first switch 102a and the second switch 102b. For example, each of the gear states 24 are represented for each of the pass accruals 222 and the diagnostic accruals 220, such that each gear state 24 may have a different value with respect to each of the pass accruals 222 and the diagnostic accruals 220. In some examples, the drive state 24a may have more pass accruals on the standard diagnostic log 214 as compared to the neutral state 24c, which results in more diagnostics 202 being logged for the drive state 24a.

As illustrated in FIG. 5, the standard diagnostic log 214 is depicted with a first switch profile 224a and a second switch profile 224b, each with a respective counter for the detected gear states 24. The controller 200 is configured to receive the signals 106a, 106b from each of the first switch 102a and the second switch 102b corresponding to one of the three gear states 24. A potential diagnostic 202 may be associated with the selected gear state 24 depending on what is received by the controller 200. For example, the controller 200 may receive the first signal 106a corresponding to the drive state 24a but does not receive the second signal 106b from the second switch 102b. In this example, the diagnostic counter 212 would record a diagnostic 202 with the second switch profile 224b of the standard diagnostic log 214, which adds to the diagnostic accrual 220 of the drive state 24a associated with the second switch profile 224b. The interlock diagnostic log 216, as mentioned above, is based upon the state 110a, 110b of the interlock switch 104 when compared to the gear switch 102. Thus, the controller 200 may identify both the switches 102, 104 having repeated diagnostics 202 logged, but may also identify the selected state resulting in the diagnostic 202.

The diagnostic accrual 220 is added incrementally based on the respective signals 110, 106a, 106b received from the interlock switch 104 and the gear switch 102 and is evaluated by the controller 200. In some examples, the gear signals 106a, 106b from the gear switch 102 may both identify the reverse state 24b and the interlock signal 110 from the interlock switch 104 identifies the open state 110a. Thus, a diagnostic 202 would accrue to the interlock diagnostic log 216 as the interlock signal 110 was determined to be inconsistent with both of the signals 106a, 106b from the gear switch 102. Stated differently, the pass accrual 222 for the interlock switch 104 occurs when all of the gear signals 106a, 106b correspond to the interlock signal 110 in that both of the signals 106a, 106b indicates selection of one of the gear states 24 and corresponds with the closed state 110b of the interlock switch 104. In a passing criteria, the user may select one of the gear states 24, which is communicated to the controller 200 via the gear signals 106a, 106b from the first switch 102a and the second switch 102b, respectively, and is also communicated to the controller 200 as the interlock signal 110 in the closed state 110b of the interlock signal 110 from the interlock switch 104.

As noted above, the interlock switch 104 is a binary switch and, thus, sends a communication corresponding to either the open state 110a or the closed state 110b without identifying the selected gear state 24. The open state 110a and the closed state 110b both relate to each one of the gear states 24 while being free from identification of a specific one of the gear states 24. Comparatively, the gear signals 106a, 106b sent from the gear switch 102 are specific to and identify the gear state 24 selected, such that the controller 200 receives at least one of three signal options from the gear switch 102. The gear signals 106a, 106b from the gear switch 102 therefore include at least one of the drive state 24a, the reverse state 24b, and the neutral state 24c.

Referring still to FIGS. 3-6, the controller 200 compares the gear signals 106a. 106b from the gear switch 102 with the interlock signal 110 to determine whether the gear switch 102 and the interlock switch 104 are cooperatively activated. Upon comparison of the gear signals 106a, 106b with the interlock signal 110, the controller 200 determines whether to assign a diagnostic 202 to one or both of the interlock diagnostic log 216 and the standard diagnostic log 214. Each diagnostic 202 assignment accrues on the respective diagnostic log 214, 216 until the predetermined diagnostic threshold 206 is met.

As mentioned above, the diagnostic counter 212 is configured with the interlock diagnostic log 216 and the standard diagnostic log 214 to segregate the respective diagnostics 202 and more readily identify the source of the diagnostic 202. Given that the interlock switch 104 is a binary switch as compared to the specified switches 102a, 102b of the gear switch 102, the interlock switch 104 may have a different diagnostic count threshold as compared to the gear switch 102. The standard diagnostic log 214, for the first switch 102a and the second switch 102b, tracks the respective gear state 24 of each of the first signal 106a and the second signal 106b. As described above, the first signal 106a and the second signal 106b translate the selected gear state 24 and, thus, the controller 200 is able to identify which of the three gear states 24 may have a distinct issue as compared with the other gear states 24. Comparatively, the interlock switch 104 is configured to give a shorthand identification of the state of the interlock switch 104. Based on the binary configuration of the interlock signal 110, an interlock diagnostic threshold 206 may be different than the standard diagnostic threshold 206.

With further reference to FIGS. 3-6, the shift system 100, in operation, is configured to determine an inconsistency between each of the first switch 102a, the second switch 102b, and the interlock switch 104 during the selection of one of the drive state 24a, the reverse state 24b, and the neutral state 24c. The inconsistency is logged in the diagnostic counter 212 of the controller 200 as a diagnostic 202. The diagnostic 202 may be more specifically attributed to one of the standard diagnostic log 214 and the interlock diagnostic log 216 depending on which of the first switch 102a, the second switch 102b, and the interlock switch 104 is attributed to the diagnostic 202. In some instances, more than one diagnostic 202 may be applied, such that both the standard diagnostic log 214 and the interlock diagnostic log 216 may accrue a diagnostic 202. It is also contemplated that the controller 200 may assess an activation time 230) between receiving each of the signals 106a, 106b, 110 to identify a potential delay in activation between the gear switch 102 and the interlock switch 104. If the activation time 230) is satisfied, then the controller 200 may log a pass accrual 222 and activate the selected gear state 24. Comparatively, if the activation time 230 exceeds a threshold time, then the controller 200 can log a diagnostic 202 in the diagnostic log 214, 216 for the respective delayed switch 102, 104.

The diagnostics 202 are accrued on the diagnostic counter 212 until the predetermined diagnostic threshold 206 stored on the memory 204 is met. Once the predetermined diagnostic threshold 206 is met, the controller 200 may prevent activation of the shifter driver interface 20 via the respective switch 102, 104 and may issue a notification to be displayed on the display 18 (FIG. 2) notifying the driver of recommended service to the shifter driver interface 20. While the diagnostic counter 212 accrues diagnostics 202 over time, the diagnostic counter 212 may be manually reset to clear the diagnostic counter of accrued diagnostics 202. Further, the controller 200 may activate the selected gear state 24 even if a diagnostic 202 is logged in the diagnostic counter 212, so long as the diagnostic logs 214, 216 are below the predetermined diagnostic threshold 206.

The controller 200 may activate the selected gear state 24 despite a diagnostic 202 being logged when at least two of the three switches 102a, 102b, 104 are registered by the controller 200. For example, the driver may select the neutral state 24c via the neutral actuator 22c (FIG. 2). In this example, the controller 200 may receive the first gear signal 106a indicating the neutral state 24c selection and the interlock signal 110 indicating the closed state 110b, but does not receive a signal from the second switch 102b. Additionally or alternatively, the second gear signal 106b may be received by the controller 200 in a delayed manner outside of the activation time 230, which may result in a diagnostic 202. The controller 200 may then log a diagnostic 202 on the second switch profile 224b corresponding to the neutral state 24c and determine whether that diagnostic 202 exceeds the predetermined diagnostic threshold 206 for the neutral state of the second switch profile 224b. If the diagnostic 202 does not exceed the predetermined diagnostic threshold 206, then the controller 200 may activate the neutral state 24c of the shifter driver interface 20. A similar process may occur with any one of the gear switches 102 and interlock switch 104 with respective to any of the gear states 24.

Figure 6:
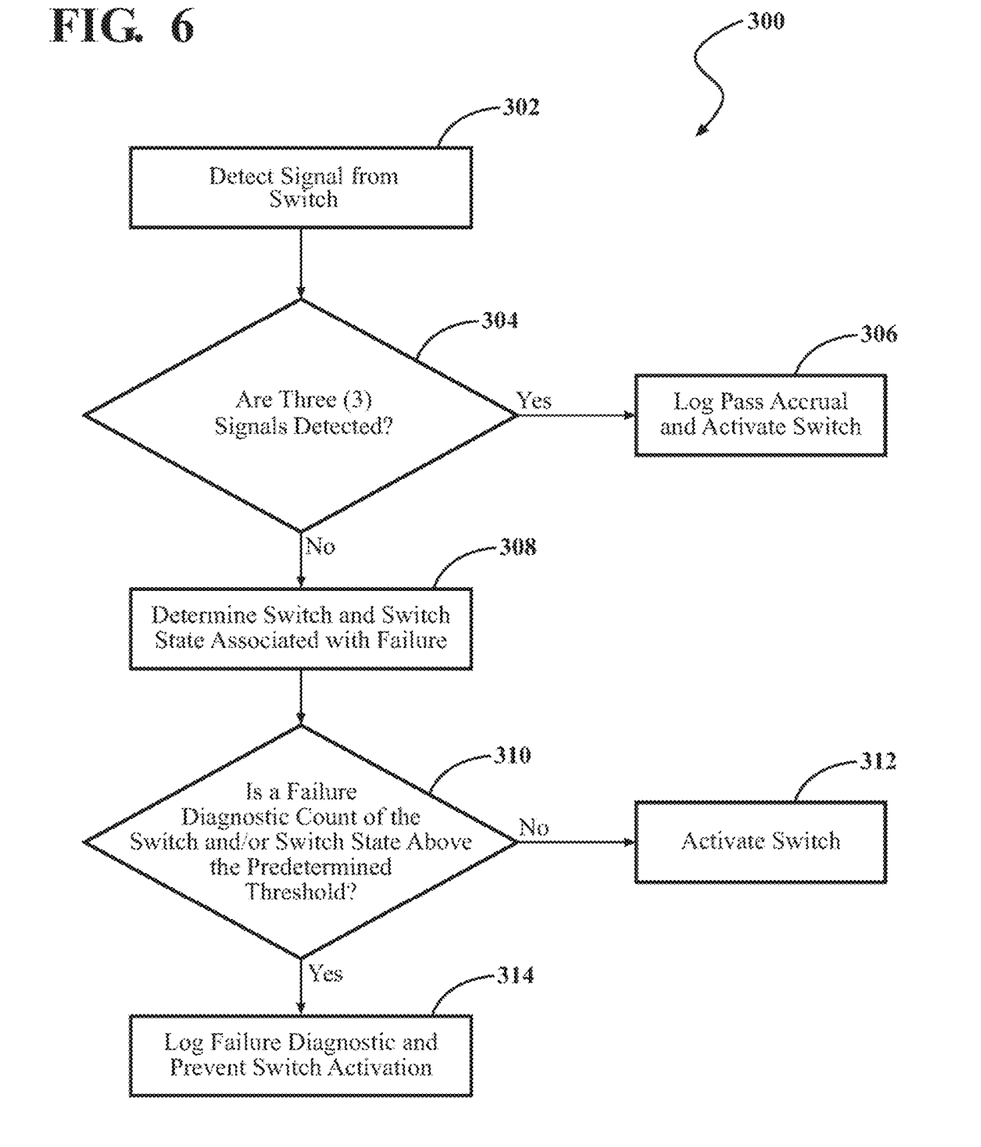
FIG. 6 is an example method of determining a diagnostic for a shifter driver interface according to the present disclosure.

With reference again to FIGS. 1-6, a method 300 of operation of the shift system 100 is provided. The method 300 of FIG. 6 is provided as an example, other similar methods may be implemented. At 302, the controller 200 detects an input signal 106a, 106b, 110 from at least one of the gear switch 102 and the interlock switch 104 and, at 304, the controller 200 determines whether three input signals 106a, 106b, 110 are detected. If the signals 106a, 106b, 110 are detected, then at 306, the diagnostic counter 212 logs a pass accrual 222 and activates the switches 102, 104. If one or more of the signals 106a. 106b, 110 are not detected, then at 308, the controller 200 identifies which of the signals 106a, 106b, 110 is not detected and logs a diagnostic 202 with the diagnostic counter 212. The controller 200 may also identify which of the gear states 24 was associated with the diagnostic 202. At 310, the controller 200 determines if the diagnostic counter 212 is above the predetermined diagnostic threshold 206. If the diagnostic counter 212 is not above the predetermined diagnostic threshold 206, then at 312, the controller 200 commands the vehicle 10 to activate the switches 102, 104 corresponding to the gear request. Comparatively, if the diagnostic counter 212 exceeds the predetermined diagnostic threshold 206, then the diagnostic 202 is logged indicating a failure, and the switch 102, 104 is prevented from activation.

The shift system 100 assists the vehicle 10 in executing gear shift requests by determining the relative safety based on the condition of the shifter driver interface 20. While the shifter driver interface 20 is still operable with two active switches 102a, 102b, 104, the shift system 100 provides a backup monitoring for potential failures by recording the diagnostic logs 214, 216. The incorporation of the interlock switch 104 minimizes the overall cost of the shift system 100 by utilizing a binary switch to identify the open state 110a or closed state 110b as it relates to a shift request. Further, as noted throughout, the binary switch minimizes the number of communication pathways through the use of a single resistor ladder circuit for the interlock switch 104.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle shift system, comprising:
   a first gear switch operable between a plurality of gear states;
   a second gear switch operable between the plurality of gear states;
   an interlock switch operable between an open state and a closed state, the closed state corresponding to one of the plurality of gear states; and
   a controller communicatively coupled to each of the first gear switch, the second gear switch, and the interlock switch, the controller including a diagnostic counter and configured to register a diagnostic on the diagnostic counter when a signal from at least one of the first gear switch, the second gear switch, and the interlock switch is different from the other of the first gear switch, the second gear switch, and the interlock switch.

2. The vehicle shift system of claim 1, wherein the plurality of gear states includes at least one of a reverse state, a neutral state, and a drive state.

3. The vehicle shift system of claim 2, wherein the closed state of the interlock switch corresponds to activation of at least one of the reverse state, the neutral state, and the drive state.

4. The vehicle shift system of claim 1, wherein the controller includes a memory storing a predetermined diagnostic threshold, the controller configured to compare a signal from the interlock switch with a signal from each of the first gear switch and the second gear switch, respectively.

5. The vehicle shift system of claim 4, wherein the controller is configured to detect one or more of the first gear switch, the second gear switch, and the interlock switch being activated via the respective signals.

6. The vehicle shift system of claim 5, wherein the diagnostic counter of the controller is configured with a passing criteria and a non-passing criteria, the diagnostic counter configured to reduce a diagnostic log based on a predetermined number of pass accruals of the passing criteria.

7. The vehicle shift system of claim 6, wherein the pass accruals include the controller receiving a signal from each of the first gear switch, the second gear switch, and the interlock switch.

8. A shift system, comprising:
   a shifter including a first switch, a second switch, and an interlock switch and being operable between a plurality of gear states; and
   a controller communicatively coupled with the shifter to receive signals corresponding to each of the first switch, the second switch, and the interlock switch, the controller including a diagnostic counter that includes a passing criteria and a predetermined diagnostic threshold and being configured to adjust the diagnostic counter based on at least one of the signals received from the shifter being inconsistent with the others of the signals received.

9. The shift system of claim 8, wherein the interlock switch is a resistor ladder circuit operable between an open state and a closed state.

10. The shift system of claim 9, wherein the controller is configured to add a diagnostic to the diagnostic counter when a signal of the interlock switch is different than a signal of at least one of the first switch and the second switch.

11. The shift system of claim 9, wherein the first switch and the second switch each includes the plurality of gear states, the plurality of gear states including at least one of a reverse state, a neutral state, and a drive state.

12. The shift system of claim 11, wherein the closed state of the interlock switch includes at least one of the plurality of gear states.

13. The shift system of claim 11, wherein the controller is configured to add a diagnostic to the diagnostic counter when the interlock switch is in the open state and the first switch and the second switch are in a same one of the plurality of gear states.

14. The shift system of claim 8, wherein the diagnostic counter includes a standard diagnostic log and an interlock diagnostic log, the standard diagnostic log corresponding to signals received from the first switch and the second switch and the interlock diagnostic log corresponding to a signal received from the interlock switch.

15. A shift system for a vehicle, comprising:
   a gear switch including a first switch and a second switch each operable between at least one of a reverse state, a neutral state, and a drive state;

an interlock switch communicatively coupled to the gear switch and operable between an open state and a closed state, the closed state selectively corresponding to one of the reverse state, the neutral state, and the drive state; and a controller communicatively coupled to the gear switch and the interlock switch and configured to receive signals from the interlock switch and the gear switch, the controller storing a diagnostic counter configured to track a difference between the signal received from the interlock switch and the signal received from the gear switch, the diagnostic counter including a predetermined diagnostic threshold for each of the gear switch and the interlock switch, respectively.

16. The shift system of claim 15, wherein the signal of the interlock switch includes one of the open state and the closed state of the interlock switch and the signals of the gear switch includes at least one of the reverse state, the neutral state, and the drive state of each of the first switch and the second switch.

17. The shift system of claim 16, wherein the controller is configured with a passing criteria and is configured to reduce a diagnostic count of the diagnostic counter based on the passing criteria.

18. The shift system of claim 17, wherein the passing criteria is defined by the interlock switch being in the closed state and both of the first switch and the second switch being in a same state of any one of the reverse state, the neutral state, and the drive state.

19. The shift system of claim 15, wherein the controller is configured to determine an activation time between the signals received from the gear switch and the interlock switch.

20. The shift system of claim 19, wherein the controller is configured to log a pass accrual based on the activation time.

* * * * *